J. W. SMITH.
ARTIFICIAL LIMB.
APPLICATION FILED APR. 11, 1919.

1,368,851.

Patented Feb. 15, 1921.
6 SHEETS SHEET 1.

WITNESSES

INVENTOR
John William Smith,
BY
ATTORNEYS

UNITED STATES PATENT OFFICE.

JOHN WILLIAM SMITH, OF CHICAGO, ILLINOIS.

ARTIFICIAL LIMB.

1,368,851.   Specification of Letters Patent.   Patented Feb. 15, 1921.

Application filed April 11, 1919. Serial No. 289,380.

*To all whom it may concern:*

Be it known that I, JOHN WILLIAM SMITH, a subject of Great Britain, and a resident of Chicago, in the county of Cook and State of Illinois, have invented a new and Improved Artificial Limb, of which the following is a full, clear, and exact description.

The present invention relates to new and useful improvements in artificial limbs, and pertains more particularly to a construction especially adapted for artificial arms.

It is one of the objects of the present invention to provide an artificial arm which is capable of use in cases where the natural arm has been amputated either between the shoulder and elbow or between the elbow and the wrist.

A further object of the present invention is to construct an artificial arm in such a manner that the forearm section is movable with relation to the upper arm section.

A further object of the invention is to provide means whereby this operation may be carried out upon movement of that portion of the limb on which the artificial arm is secured.

A further object of the present invention is to provide means whereby this relative movement of the forearm and upper arm may be carried out mechanically.

A further object of the present invention is to construct an artificial arm in such a manner that the hand section is universally movable with respect to the forearm section.

A further object of the present invention is to provide means for locking the hand section in any one of a plurality of positions to which it may be adjusted with respect to the forearm section.

A further object of the invention is to construct a hand section for artificial arms in which there are finger sections movable with respect to the body portion of the hand.

A further object of the invention is to provide means for operating the finger sections to cause them to grip articles of various shapes and sizes.

A further object of the invention is to provide means for locking these finger sections in position after an article has been gripped.

A further object of the present invention is to provide suitable means for attaching the artificial limb to the body of the user.

With the above and other objects in view which will appear as the nature of the invention is better understood, reference is to be had to the accompanying drawings in which—

Fig. 36 is a perspective view of the hand member closed.

Description.

Referring more particularly to the drawings, the device comprises an upper arm member 50, a forearm member 51, a wrist member 52, and a hand member 53. The upper arm member 50 and the forearm member 51 may be covered with any suitable material, such as fiber, for the purpose of imitating human flesh, and said members 50 and 51 are shaped as nearly similar to the relative sections of the human arm as is possible.

Figure 8:
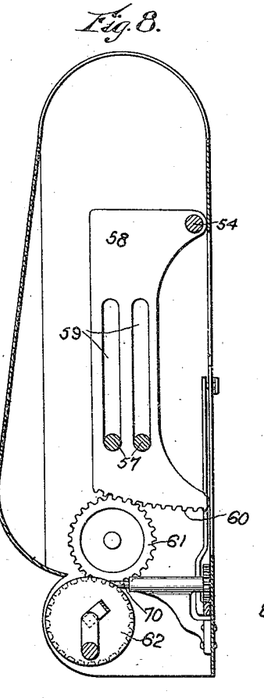
Fig. 8 is a sectional view on the line 8—8 of Fig. 7, taken in the direction of the arrows A—A.

Pivotally mounted by means of a transversely extending pin or shaft 54, within the upper arm member 50, is a hollow member 55, said hollow member being adapted to receive the arm extension of the wearer. This hollow member 55 is provided with suitable ventilating openings 56, as seen in Fig. 4. Rigidly carried by the hollow member 55 on the outer face of one side thereof, are two pins 57, said pins being arranged in spaced relation as shown in Figs. 5 and 8.

Pivotally mounted on the pin or shaft 54, and positioned in the space between the tubular member 55 and the upper arm member 50, is a plate 58, said plate being provided with two spaced slots 59, which are adapted to receive said pins 57. The outer free end of the plate 58 is curved and is provided with a plurality of teeth which form a rack 60.

Rotatably mounted within the upper arm member 50, near the lower end thereof, is a pinion 61, and slidably mounted on a shaft 63, is a pinion 62, which meshes with the aforementioned pinion 61. The rack 60 is adapted to engage the pinion 61 and form the means by which the same is rotated when the plate 58 is rocked about the shaft 54 in a manner to be hereinafter described. The shaft 63 is rigidly carried by the forearm member 51, and that portion of the shaft 63 on which the pinion 62 slides is squared as at 64. Rigidly carried by the pinion 62 and spaced therefrom by means of the hub 65, is a flange 66.

Mounted in the inner face of the upper arm member 50, is a bracket 67, the upper end of which is provided with a bearing 68, and mounted in said bearing 68, is a shaft 69, the outer end of which is formed with a crank 70. The crank 70 lies in the space between the pinion 62 and the aforementioned flange 66, and when rocked in the bearing 68, is adapted to engage either the flange 66 or the inner face of the pinion 62, and disengage or engage said pinion 62 with the pinion 61, dependent upon the direction of movement of the shaft 69. Carried by the shaft 69, is a small pinion 71, and meshing with the pinion 71, is a pinion 72, which is rotatably mounted in the upper arm member 50.

Pivotally secured, as at 73, to the inner face of the upper arm member 50, is a lever 74, the lower extremity of which is formed with a right-angularly disposed rack 75, which is adapted to mesh with the pinion 72. On its outer end, said lever 74 is provided with an operating button 76, which moves through an arcuate slot 77, and upon movement of the button 76, the lever 74 is rocked about its pivot 73. Through the medium of the rack 75, and the pinions 71 and 72, the pinion 62 is either engaged with or disengaged from the pinion 61.

Rigidly secured to the inner face of the upper arm member 50, are two pins 78, and slidably mounted on the pins 78, is an arcuate rack member 79, said rack member 79 being provided with slots 80 in which said pins 78 are adapted to be received. Depending from the rack member 79 is a lever 81, the lower extremity of which is provided with an operating button 82, which projects through an angular slot 83 in the side of the upper arm member 50. The slot 83 has two transversely extending passages 84, which are connected by a vertical passage 85, and it will be seen that when the operating button 82 is moved across the lower transverse passage 84 and up the vertical passage 85 into the transverse passage 84, the rack will be elevated and maintained in said elevated position.

Figure 9:
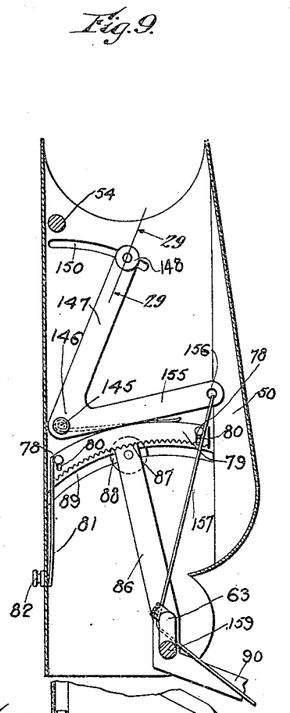
Fig. 9 is a sectional view on the line 9—9 of Fig. 7, looking in the direction of the arrows B—B.
Figure 10:
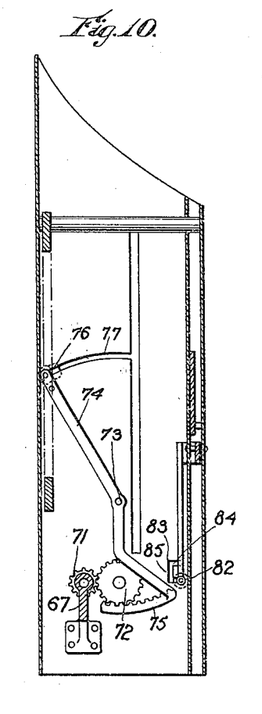
Fig. 10 is a sectional view on the line 10—10 of Fig. 7.
Figure 11:
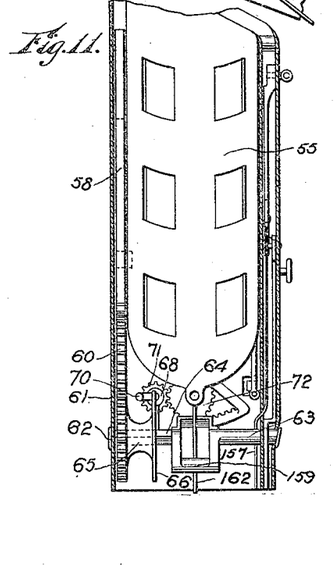
Fig. 11 is a sectional view on the line 11—11 of Fig. 7.

Pivotally mounted within the upper arm member 50, is a lever 86, the upper end of said lever being provided with a plurality of rack-engaging teeth 87, which are adapted to interengage with the teeth of the rack 79 when the same is in the lowered position shown in Fig. 9. The lever 86 is provided with an operating button 88, which moves through an arcuate slot 89, and said lever is free to move when the rack 79 is disengaged from the teeth 87 thereof in the manner heretofore described. The lower end of the lever 86 is provided with an extension 90, said extension being pivotally secured to the forearm member so that as the lever 86 is rocked, the forearm member is raised or lowered dependent upon the direction of movement of the lever.

Secured within the outer end of the forearm member 51, by means of screws or the like 91, is a bearing member 92, said bearing member being provided with a central opening 93. The wrist member 52 is provided with an internal annular member 94, which is adapted for engagement within an annular slot 95 on the exterior of the bearing member 92, and the annular member 94 is adapted for movement within the annular slot 95.

Rigidly mounted within the central opening 93 of the bearing member 92, is a hollow member 96, which has an enlarged flange 97. Secured to this enlarged flange 97, by means of screws 98, is a forwardly-projecting tubular member 99, the inner face of the forward end of which is curved as at 100. The inner end of the wrist member is secured to a flange 101 on the inner end of the tubular member 99, by means of screws 102, and to the outer edge of the enlarged flange 97 by screws 103.

Secured to the inner end of the hollow member 96, as by screws 104, is a bevel gear 105, and meshing with said bevel gear 105, is a bevel gear 106. Secured to the bevel gear 106, by means of rivets, screws, or the like, 107, is an arm 108. Pivotally connected to the arm 108, as at 109, is a lever 110, which extends longitudinally of the forearm member, as shown in Figs. 5 and 6. The inner end of the lever 110 is pivotally secured at 111, to a flange 102, which projects from the forward side of a rectangular housing 113.

Mounted within the rectangular housing 113, is a rectangular plate 114, one edge of which is serrated, as at 115, and this serrated edge 115 is adapted for engagement with serrations 116 in the edge of a plate 117, which plate 117 is secured to the inner edge of the forearm member by means of rivets or the like, 118. Projecting through a slot 119 in the side of the forearm member, is a stem 120, the outer end of which is provided with an operating button 121, the inner end of said stem being removably secured to the rectangular plate 114.

Mounted between the wall 122 of the rectangular housing 113 and the plate 114, is a helical spring 123. This spring maintains the serrated edge 115 of the plate 114 in engagement with the serrated edge 116 of the plate 117. If the button 121 be depressed, it will be seen that the serrated edge 115 of the rectangular plate 114 will be disengaged from the serrated plate 117, and the rectangular housing 113 will be free to move longitudinally of the forearm member 51. This movement of the rectangular housing 113, through the medium of the lever 110 and the arm 108, rotates the bevel gear 106, which in turn will rotate the bevel gear 105, tubular member 93, flange 97, and the wrist member 52, which is secured thereto.

The bearing member 92 has a right-angular extension 124, said extension being provided with an internally threaded passage 125. The bevel gear 106 is provided with a screw-threaded shaft 126, which has threaded engagement with the passage 125. Secured to the outer end of the screw-threaded shaft 126, is a lever 127, which is provided on one of its ends with an operating button 128.

Rotation of the bevel gear 106, by means of the lever 110 and arm 108, as heretofore described, while sufficient to move the wrist member 51 the desired amount, is insufficient to cause the disengagement of the bevel gears 105 and 106 as would be supposed, due to the screw-threaded shaft 126 of the bevel gear 106. However, when it is desired to disengage the bevel gears 105 and 106, it is merely necessary to grasp the operating button 128 on the lever 127, and rotate the same, which action causes a disengagement of said bevel gears.

Figure 12:
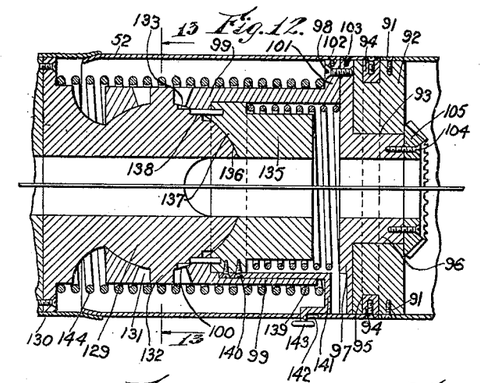
Fig. 12 is an enlarged longitudinal sectional view of the wrist member.
Figure 13:
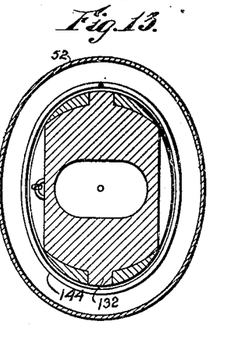
Fig. 13 is a transverse sectional view on the line 13—13 of Fig. 12.

Carried by the hand member 53 and projecting rearwardly into the wrist member 52, is a ball member 129, said ball member being secured to the hand member by means of screws 130. This ball member 129 is adapted to be received within the curved face 100 of the tubular member 99, as shown in Fig. 12. The curved face 100 of the tubular member 99 is provided with two diametrically opposite openings 131, and these openings are adapted for the reception of diametrically opposite projections 132 on the ball member 129. The ball member 129 is provided with a plurality of slots or recesses 133, the inner faces of which are stepped, as at 134, the purpose of which will be hereinafter described.

Mounted within the tubular member 99 is a sliding block 135, which has a curved face 136 adapted for engagement with the outer curved portion 137 of the ball member 129, and projecting forwardly from the front face of said block 135 are a plurality of pins 138, which latter are adapted for engagement with the stepped faces 134 in the slots 133 of the ball member 129. This block member 135 is maintained in forward position by means of a coil spring 139, and connected to said block by means of screws 140, is an operating lever 141, the free end of which projects through a slot 142 in the wrist member 52, said free end being provided with an operating button 143. By grasping the operating button 143, it will be seen that the block 135 is capable of movement against the action of the spring 139 to cause engagement or disengagement of the pins 138 with the stepped faces 134 in the slots 133.

Surrounding the tubular member 99 and in engagement with the base of the ball member 129, is a coil spring 144, and it is the purpose of this spring 144 to resiliently maintain the wrist member 52 and the hand member 53 in longitudinal alinement.

Figure 14:
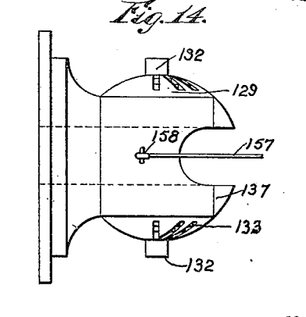
Fig. 14 is a side elevation of the ball member of the wrist joint.
Figure 15:
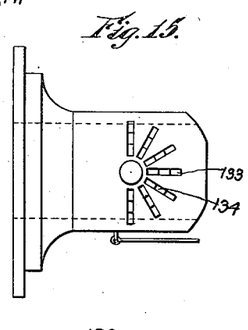
Fig. 15 is a plan view of the ball member.
Figure 16:
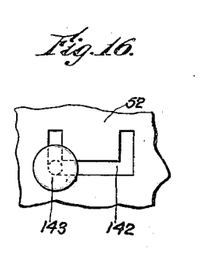
Fig. 16 is a detail view of the means for locking the wrist-operating mechanism.

Pivotally mounted as at 145, in the hollow member 55, is an angular lever 146, and said angular lever 146 has a vertical arm 147, the upper end of which is provided with a button 148, the shank 149 of which projects through an arcuate slot 150 in the upper arm member. The shank 149 has a T-head 151, which is pivotally mounted in spaced ears 152, and said spaced ears 152 are secured in place to the body harness, by means of a shank 153, which projects through an opening 154 and is provided with a washer 155, over which the head of the shank may be upset. The angular lever 146 has an extending arm 155, the outer end of which is provided with a perforation 156, and fastened within said perforation 156, is a flexible cord or the like 157, the other end of said cord being secured to the ball member 129, as at 158, and shown in Fig. 14.

Figure 17:
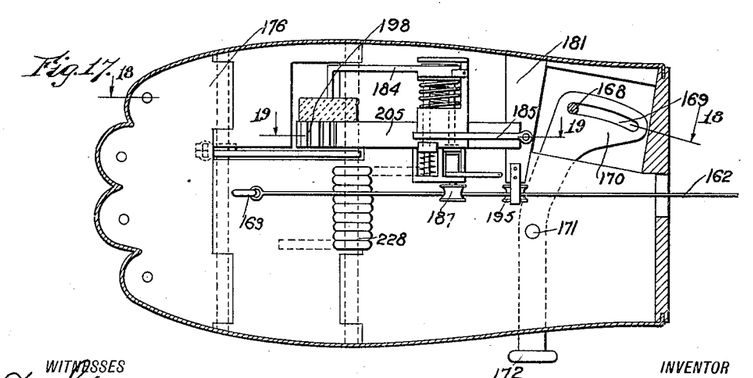
Fig. 17 is a longitudinal sectional view on the line 17—17 of Fig. 18.

Extending transversely of the hollow member 55 at its lower end, is a pin 160, and inclosing said pin is a ring 161, said ring being carried upon the extremity of a flexible cord 162. This cord 162 passes around the offset portion 159 of the shaft 63, and has its opposite end secured to the ring 163, which in turn is fastened to the hand section 53, as shown in Figs. 4 and 17.

Figure 1:
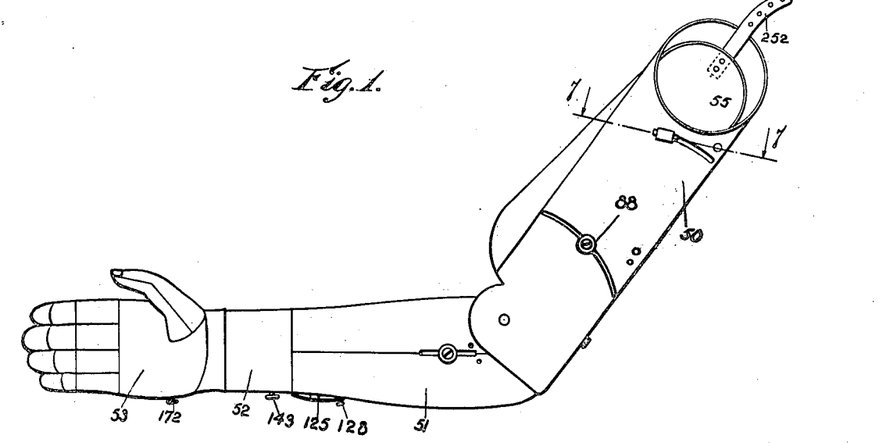
Figure 1 is a side elevation of the complete arm.
Figures 18, 19, 20, 21, 22, 23, 24, 25:
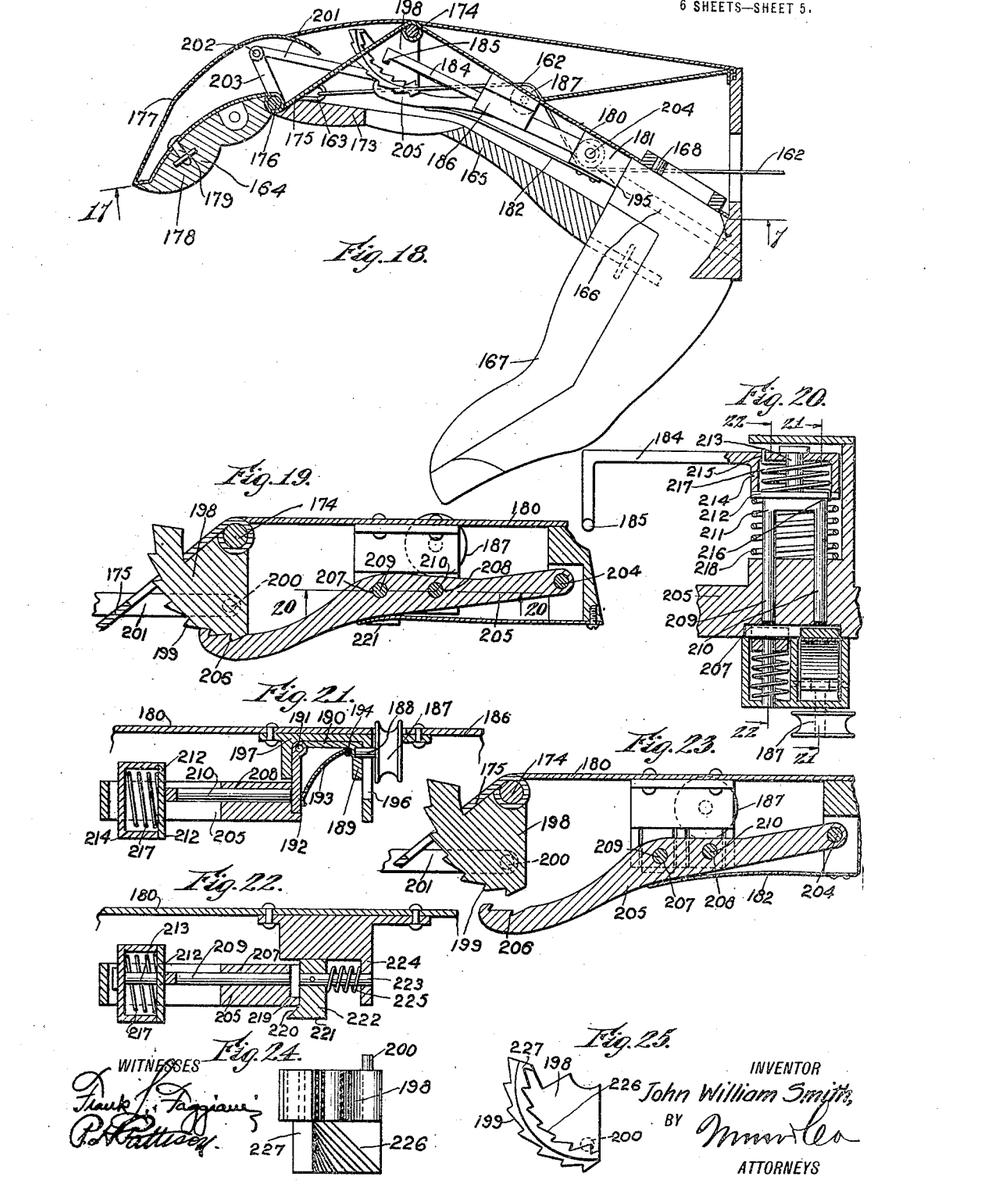
Fig. 18 is a longitudinal sectional view on the line 18—18 of Fig. 17.
Fig. 19 is a sectional view on the line 19—19 of Fig. 17.
Fig. 20 is a sectional view on the line 20—20 of Fig. 19.
Fig. 21 is a sectional view on the line 21—21 of Fig. 20.
Fig. 22 is a sectional view on the line 22—22 of Fig. 20.
Fig. 23 is a sectional view similar to Fig. 19, but showing the finger-locking mechanism in released position.
Fig. 24 is a bottom plan view of the rack of the finger mechanism.
Fig. 25 is an end elevation thereof.

As shown in Fig. 18, the hand member comprises three sections, i. e., two finger sections 164, 173, and a palm section 165. Pivotally mounted, as at 166, is a thumb member 167, and on its inner end, said thumb member carries a pin 168. The pin 168 projects into a cam slot 169 in a lever 170, which lever is pivoted as at 171, and has an operating button 172 projecting beyond the hand member, as shown in Figs. 1 and 17. By this construction, it will be seen that as the lever 170 is rocked about its pivot, the desired adjustment of the thumb may be obtained.

Mounted between the finger section 164 and the palm section 165, is an intermediate section 173, which is pivoted at 174, said intermediate section 173 being carried by a plate 175, to which the finger section 164 is pivoted by means of a transversely extending pintle 176. The finger section 164 comprises a hollow sheet metal member 177, the inner face of which is provided with soft material, such as rubber, and designated by the reference character 178, said soft material being secured in place by means of studs 179.

The reference character 180 designates an angularly disposed plate within the hand member, and carried by said plate is a block 181. Projecting forwardly of the hand member and secured to the block 181, is a spring 182, the purpose of which will be hereinafter described. Carried by the angular plate 180 is a housing 186, and rotatably mounted in the housing 186, is a pulley 187. The pulley 187 is provided with a projecting shaft 188, and said projecting shaft 188 is mounted in the right-angular extension 189 of the pivoted arm 190 of a right-angular pivoted member, the two arms of which are pivotally secured together as at 191. Maintaining the two arms 190 and 192 of the right-angular member in right-angular relation, is a spring 193, said spring being pivotally secured as at 194.

Mounted on the block 181, is a pulley 195, and the flexible cord 162 is adapted to pass under said pulley 195 and over the pulley 187, as shown in Fig. 18. By this construction of parts, it will be seen that as the flexible cord 162 is tightened, the pulley 187 will be depressed, its shaft 188 having sliding movement in the slot 196, of the bracket member 197. This movement of the pulley 187 sets up a movement of the right-angular hinge member for a purpose to be hereinafter described.

Pivotally carried by the pintle 174, is a segmental member 198, the outer curved edge of which is provided with a plurality of spaced teeth 199. The segmental member 198 is provided with a stud shaft 200, and pivotally connected thereto is a lever 201, the forward end of which is pivoted as at 202, to the lever 203, which is rigidly carried by the pintle 176. These parts form a mechanism for operating the forward finger portion 164.

Pivotally secured as at 204, is a lever 205, the outer end of which is provided with a plurality of teeth 206, which are adapted to engage the teeth 199 of the segmental member 198 to secure the same against movement about its pivot 174.

The lever 205 is provided with two openings 207 and 208, and passing through the openings 207 and 208, respectively, are legs 209 and 210, of a forked member 211. This forked member is provided with a plate 212, and projecting from this plate is a stub shaft 213. Mounted for rotation on the stub shaft 213, is a lever 184, the forward end of which is provided with a right-angular portion 185, which terminates in a right-angular pin 185'. The pivoted end of the lever 184 is formed with a housing 214, and secured as at 215 to said lever 184, at one end and to the plate 212, as at 216, is a coil spring 217. Mounted between the plate 212 and the lever 205, is a coil spring 218, which serves to keep the extremities of the two legs 209 and 210 of the forked member within the lever 205, as shown in Fig. 20. When the cord 162 is tightened, the lever 205 will be rocked about its pivot 204, to a point where it disengages with the teeth 199 of the segmental member 198, such as shown in Fig. 23. This action is brought about in the following manner: Pressure for tightening the cord 162 is exerted upon the pulley 187, and said pulley moves the lever 205 about its pivot 204 until the extending flange 219 rides over the inclined face 220, and engages the outer face 221 of a latch 222. This latch is carried by a shaft 223, which is slidably mounted in a bracket 224 and said latch 222 is maintained in engagement with the lever 205 by means of a coil spring 225. When the flange 219 has been engaged with the outer face 221 of the latch 222, it will be seen that the lever 205 will be maintained in a position where its teeth 206 will not engage the teeth 199 of the segmental member 198.

With the parts in this position, it will be seen that the intermediate finger section 173 will be free to move about its pivotal point 174. Oppositely disposed with relation to the teeth 199 of the segmental member 198, are teeth 226, which, as shown in Fig. 24, are angularly disposed with relation to the flange 227 in which they are formed. These teeth 226 are adapted to lie in the path of the extremity 185' of the lever 184, and upon movement of the intermediate hand section 173, said teeth are adapted to engage with said lever. After the teeth 226 have engaged the extremity 185' of the lever 187, continued stress upon the cord 162 causes the lever 184 to be guided in a direction transverse of the hand, and moves the two legs 209 and 210 of the forked member 211 in the openings 207 and 208 against the action of the spring 218. This forces the free end of the leg 209 to engage with the latch member 222 and move the same against the action of the spring 225 to release the flange 219 from the face 221 of said latch member, and permit the lever 205 to move to the position shown in Figs. 19 and 22, in which position its teeth 206 engage with the teeth 199 of the segmental member 198 to secure the intermediate finger section 173 against movement relative to the palm section 165.

When the teeth 206 of the lever 205 have been disengaged from the teeth 199 of the segmental member 198, the coil spring 228 serves to move the hand member to the open or extended position, it being understood that any closing movements of the hand member are carried on against the action of said spring 228.

As above stated, the cord 162 is secured to the inner end of the internal hollow member 55, and said cord is tightened to perform the above described movements for opening and closing the hand by a movement of said hollow member longitudinally of the upper arm member 50, said tubular member being slidably mounted on the pin or shaft 54, as well as pivotally mounted thereon to permit of this operation. Thus it will be seen that as the hollow member 55 is moved longitudinally of the upper arm member 50, by a movement of that portion of the human arm which the hollow member 55 embraces, the cord 162 will be tightened for the purpose heretofore mentioned.

In Figs. 26, 27, 28 and 31 is shown a modified form of the invention, and in this form the device is adapted for use in cases where the arm has been severed at a point below the elbow. In this form the device comprises two tubular members 230 and 231, the member 230 having an internal tubular member 232, while the member 231 has an internal tubular member 233. These several members are pivotally secured together by means of pins or the like 234.

The reference character 235 designates a substantially inverted T-shaped lever, which is pivoted at 236, and secured to the ends of the arms of said T-shaped member are cords 237 and 238, which extend to the universal mounting of the hand member and the finger-operating mechanism, respectively. The lever 235 is provided with an operating button 239, which projects through an arcuate slot 240, and to secure said lever in any one of its adjustable positions, an arcuate rack 241 is slidably mounted by means of pins 242 operating in elongated slots 243. The upper end of the lever 235 is provided with a plurality of notches with which the teeth of the rack 241 are adapted to engage and said rack is maintained in engagement with said lever by means of a spring 244.

Figure 2:
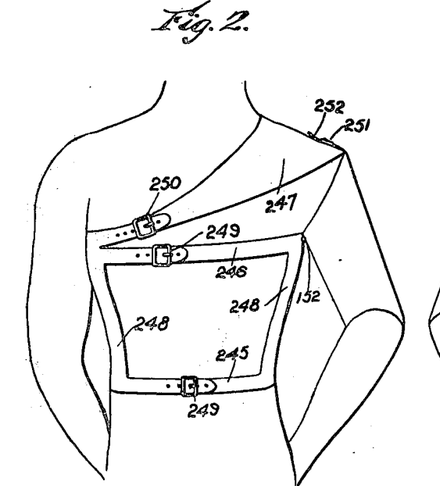
Fig. 2 is a view in front elevation showing the harness by which the arm is secured to the body of the user.
Figure 3:
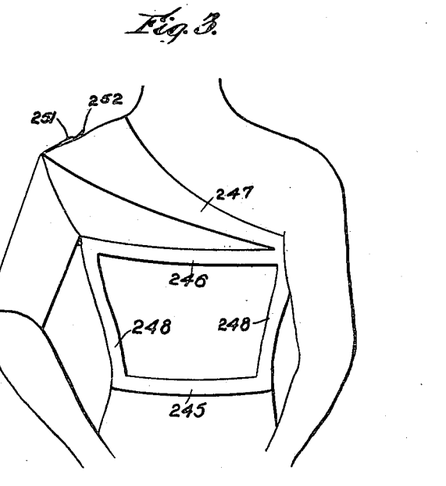
Fig. 3 is a rear view thereof.
Figures 3, 4, 5, 6, 7:
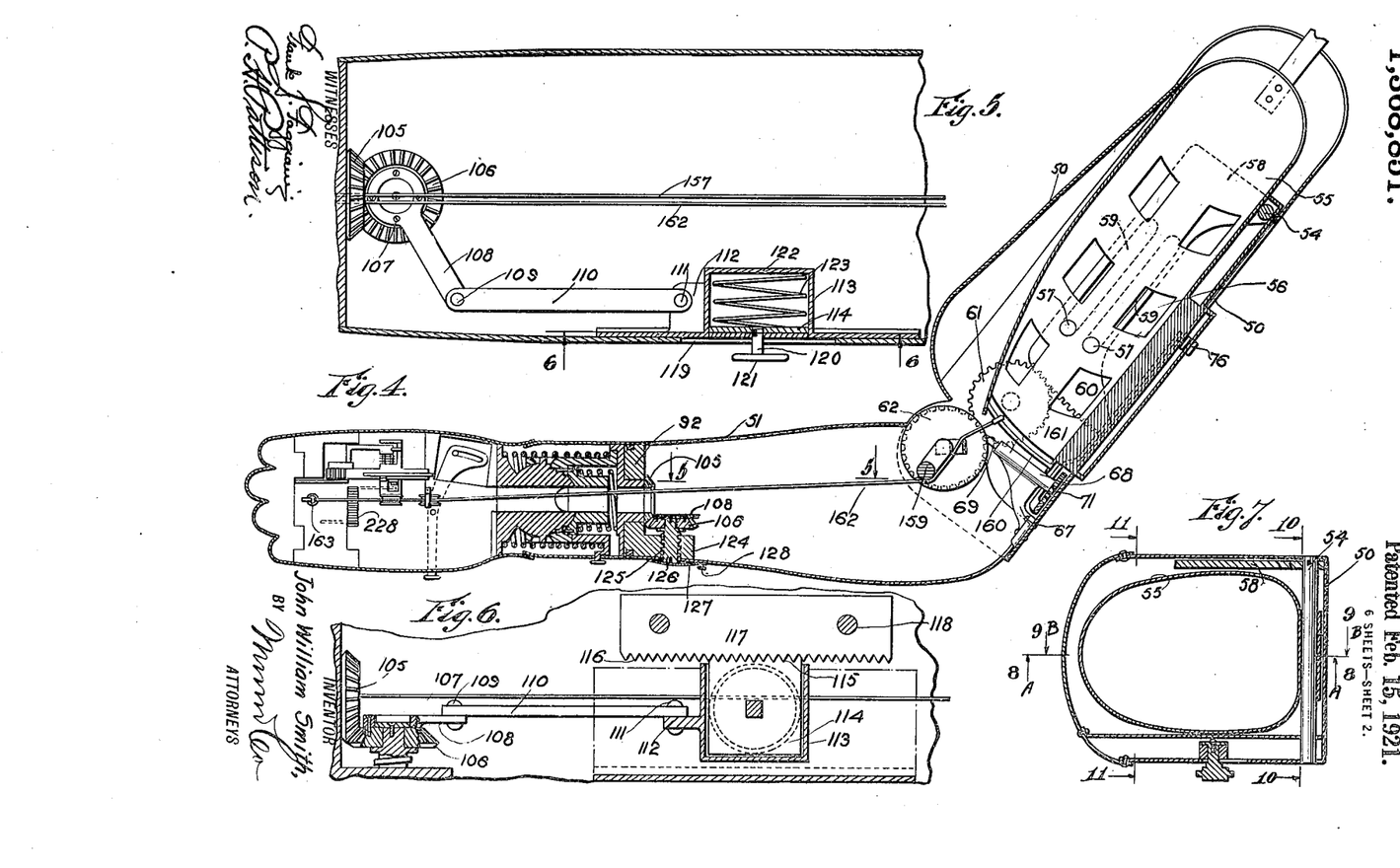
Fig. 4 is a longitudinal sectional view of the complete arm.
Fig. 5 is a horizontal sectional view on the line 5—5 of Fig. 4.
Fig. 6 is a horizontal sectional view on the line 6—6 of Fig. 5.
Fig. 7 is a transverse sectional view on the line 7—7 of Fig. 1.

In Figs. 2 and 3 are shown a front and a rear view, respectively, of the arm-attaching means, and the same comprises a harness, which consists of a waist member 245, a chest member 246, and a shoulder member 247. The waist and chest members 245 and 246 are connected by vertically-extending straps 248, and said waist and chest members are provided with buckles 249, by means of which the desired adjustment may be obtained. The shoulder member 247 is provided with a buckle 250, by which proper adjustment thereof can be made, and over the shoulder, said member is provided with a second buckle 251, which is adapted to receive the strap 252 of the upper arm member 50 to secure the same in place.

Figures 26, 27, 28, 29, 30, 31, 32, 33, 34, 35:
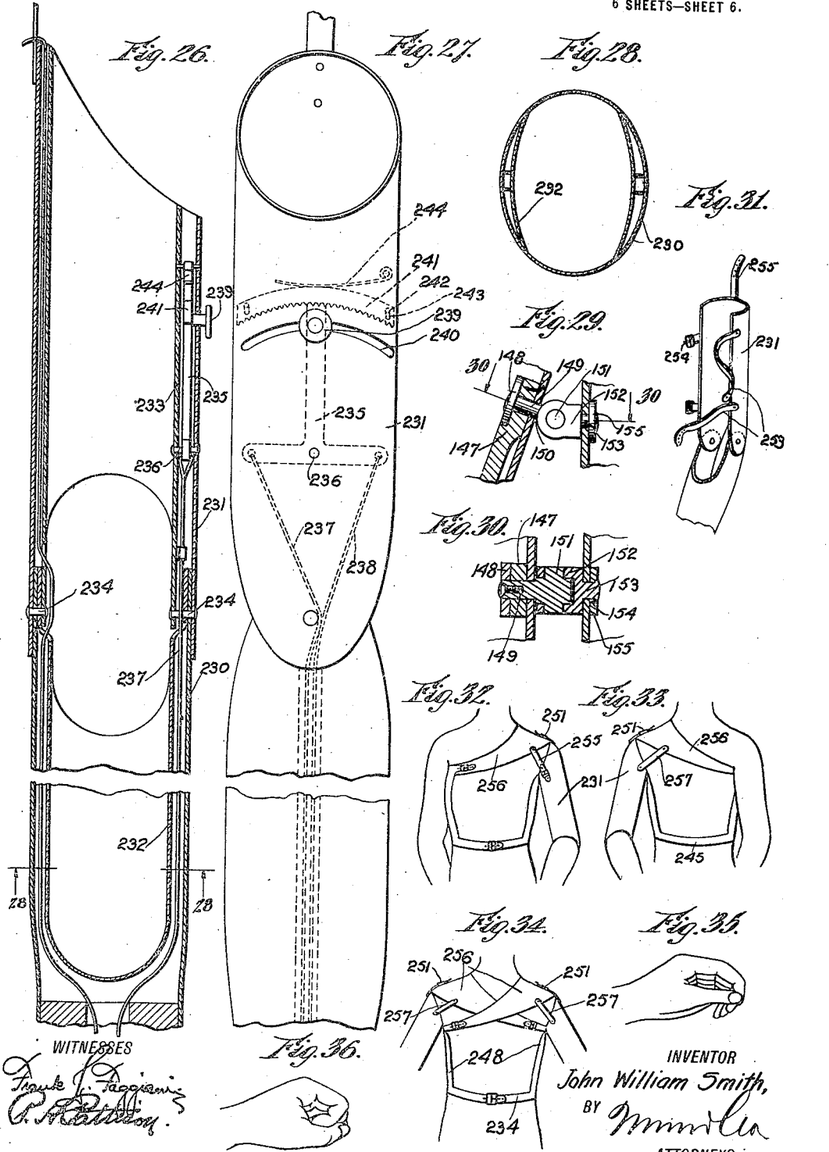
Fig. 26 is a longitudinal sectional view of a modified form.
Fig. 27 is a view in elevation of the modified form.
Fig. 28 is a sectional view on the line 28—28 of Fig. 26.
Fig. 29 is a sectional view on the line 29—29 of Fig. 9.
Fig. 30 is a sectional view on the line 30—30 of Fig. 29.
Fig. 31 is a perspective view of a modified form of attaching means.
Fig. 32 is a front elevation of the means employed for securing the modified form disclosed in Figs. 26 and 27, to the body of the user.
Fig. 33 is a rear elevation thereof.
Fig. 34 is a front elevation of means employed for securing two of the artificial limbs in position on the body of the user.
Fig. 35 is a perspective view of the hand member partly closed.

The modified form of the invention as shown in Fig. 31, is secured in place by means of the straps 253, which are adapted to engage the buckles 254, and the upper tubular member 231 is provided with a strap 255, which is adapted to engage the buckle 251 of the shoulder member 256, as shown in Figs. 32 and 33. In this form of the invention, the chest strap 246 is eliminated, and the upper arm member 231 is further connected to the shoulder member 256 by means of links or the like 257. In Fig. 34, a means for attaching two artificial arms is shown, and in this form, two shoulder straps 256 are likewise employed.

*Claims.*

1. An artificial limb comprising an upper arm member, a forearm member pivotally secured to the upper arm member, a hand member mounted upon the upper end of the forearm member, and means carried by the upper arm member and pivotally mounted therein for operating the forearm member, said pivoted means being capable of reciprocating movement longitudinally of the upper arm member for operating the hand member without effecting an operation of the forearm member.

2. An artificial limb comprising an upper arm member, a forearm member and a hand member, and a hollow member pivotally and reciprocatively mounted in said upper arm member, said hollow member being adapted to operate the hand member when reciprocated, and the forearm member when pivotally swung, substantially as described.

3. An artificial limb comprising an upper arm member, a forearm member, and a hand member; a tubular member pivotally mounted in said upper arm member; and means connected to said tubular member for operating the forearm member upon movement of said tubular member about its pivotal point.

4. An artificial limb comprising an upper arm member, a forearm member, a tubular member pivotally mounted in said upper arm member, and means operated by the movement of said tubular member about its pivotal point for operating the forearm member.

5. An artificial limb comprising an upper arm member, a forearm member, and a hand member, and a single operating means pivotally and reciprocatively mounted in the upper arm member for independently operating said forearm and hand members.

6. An artificial limb comprising an upper arm member, a forearm member pivotally carried by the upper arm member, a hand member pivotally carried by the forearm member, means for simultaneously operating the forearm member and the hand member, and separate means for independently operating the hand member.

7. An artificial limb adapted to be worn upon the stubs of natural limbs, and comprising a plurality of hinged sections in simulation of members of the body, means dependent upon movement of the stub for simultaneously and independently operating said pivoted members, and separate hand-operated means for independently operating said several pivoted members.

8. An artificial arm comprising an upper arm member, a forearm member pivotally connected thereto, a hand member carried by said forearm member and universally adjustable with respect thereto, means carried by said upper arm member for adjusting said hand member, and independent means carried by said forearm member for adjusting said hand member.

9. An artificial arm comprising an upper arm member, a forearm member pivotally connected thereto, a wrist member axially movable with respect to the forearm member, a hand member axially movable with respect to the wrist member and the forearm member, means carried by the upper arm member for operating the forearm member, means carried by the upper arm member for actuating the wrist member, and means for actuating the hand member with relation to and independently of said wrist-member-actuating means.

10. An artificial arm comprising an upper arm member, a forearm member, a hand member, a hollow member mounted for movement longitudinally of the upper arm member, and means for actuating the hand member upon movement of said hollow member longitudinally of the upper arm member.

11. An artificial arm comprising an upper arm member, a forearm member, a hand member, a hollow member pivotally mounted within the upper arm member, an arcuate rack pivoted within the upper arm member and adapted to be operated upon the pivotal movement of the hollow member, and means operated by the pivotal movement of said arcuate rack for moving the forearm member relatively to the upper arm member.

12. An artificial arm comprising an upper arm member, a forearm member, a hand member, means movable longitudinally of the upper arm member for adjusting the forearm member relatively to the upper arm member, means for adjusting the hand member relatively to the forearm member, means for maintaining the hand member in longitudinal alinement with the forearm member upon release of the hand-member-adjusting means, and means for locking the hand member in adjusted position.

JOHN WILLIAM SMITH.